Patented Jan. 3, 1950

2,493,375

UNITED STATES PATENT OFFICE 2,493,375

LACTONE ACIDS AND DERIVATIVES THEREOF

Hans Wolff and Wendell W. Moyer, Decatur, Ill., assignors to A. E. Staley Manufacturing Company, Decatur, Ill., a corporation of Delaware No Drawing. Application July 31, 1946,
Serial No. 687,529

3 Claims. (Cl. 260—344)

This invention relates to lactone acids and their derivatives. More specifically, it pertains to isomeric saturated lactone acids of molecular formula $C_{10}H_{14}O_5$ and their derivatives by way of the carboxyl group, which lactone acids have only one lactone ring and only one carboxyl group. Provision of the novel lactone acids and their derivatives is a principal object of this invention.

Other objects of the invention will in part be obvious and will in part appear hereinafter.

The invention accordingly comprises a product possessing the features, properties, and the relation of components which will be exemplified in the product hereinafter described and the scope of the application of which will be indicated in the claims.

In a copending application filed July 31, 1946, Serial No. 687,527, there is described the preparation of two dimers of angelica lactone. These dimers are white crystalline compounds of molecular formula $C_{10}H_{12}O_4$ and each contains one ethylenic double bond conjugated with a carbonyl group. Both are dilactones. One of the dimers has a melting point of about 83 to 84° C.; the melting point of the other dimer is about 87 to 88° C. The higher melting dimer is considerably less soluble in ethanol than the lower melting one. In our copending application above referred to it is stated that angelica lactone can be dimerized by bringing it into contact under substantially anhydrous conditions with a selected catalyst having alkaline or potentially alkaline characteristics. Choice of reaction temperature and contact time for optimum results depend in part upon the nature and proportion of the catalyst used. The proportion of catalyst required for significant rate of dimerization is small, from 0.5 to 5.0 per cent of the weight of angelica lactone usually being sufficient.

Dimers of angelica lactone, according to our above mentioned copending application, can be prepared as follows:

PREPARATION OF DIMERS OF ANGELICA LACTONE WITH SODIUM METHOXIDE CATALYST

One hundred parts of beta angelica lactone were mixed with 2 parts of dry finely powdered sodium methoxide in a vessel equipped with a mechanical stirrer. While being stirred, the mixture was heated to about 80° C. and held at that temperature for about 30 minutes, during which time the catalyst slowly dissolved. The reaction solution was then cooled to about room temperature, neutralized with cold dilute aqueous hydrochloric acid, and separated from the aqueous phase. The separated water layer was extracted with chloroform, and the chloroform extract was combined with the organic liquid separated from the neutralized reaction mixture. The combined extract and main reaction product were then distilled through a short fractionating column, first under the reduced pressure of a water aspirator to remove chloroform, and then at a receiver pressure of about 3 mm. of mercury. The bulk of the reaction solution distilled over the temperature range of 215 to 230° C. About 61 parts of this fraction was obtained.

The fraction distilling at 215 to 230° C. at 3 mm. was diluted with about an equal volume of dry methanol and allowed to stand overnight in a refrigerator at about 5° C. to induce crystallization. The crop of crystals thus obtained was separated from mother liquor, washed with a small volume of cold methanol, and dried. The colorless crystalline product melted at 83 to 84° C., after recrystallization from ethanol or benzene, and its yield amounted to 38 parts or 62 per cent of the collected fraction.

The saponification equivalent of the product melting at 83 to 84° C. was found to be about 98, and warm acidification of its saponification solution yielded a saturated lactone acid which, after purification by recrystallization from water, had a melting point of about 123 to 124° C., a neutralization equivalent of about 214, and a saponification equivalent of about 107. Cryoscopic determination of the molecular weight of the product melting at 83 to 84° C., using camphor, gave a value of 232, and analyses for carbon and hydrogen showed that the compound contained 6.36 per cent hydrogen and 61.3 per cent carbon (calculated for dimeric angelica lactone: mol. wt. 196, carbon 61.2 per cent, hydrogen 6.12 per cent). This elementary composition and approximate molecular weight indicates a molecular formula of $C_{10}H_{12}O_4$.

Determinations of saponification equivalent, molecular weight, and elementary composition made of the liquid residue remaining after separating the crop of crystalline material from the fraction distilling at 215 to 230° C. at 3 mm. gave substantially the same values as those found for the crystalline product. Acidification of the saponified liquid residue yielded a less soluble lactone acid which, after recrystallization from water, had a neutral equivalent of about 214, a saponification equivalent of about 107, and a melting point of 155 to 156° C. The determined elementary compositions and approximate molecular weights of both lactone acids indicate that their common molecular formula is $C_{10}H_{14}O_5$.

Substitution of other alkali alkoxides for sodium methoxide in this example, such as sodium ethoxide, sodium butoxide, or the corresponding alcoholates of potassium and lithium, yields similar results. Use of alpha angelica lactone with alkali alkoxides under the conditions of this example provided lower yields of the dilactones, but otherwise the results were similar to those obtained with the beta form.

PREPARATION OF DIMERS OF ANGELICA LACTONE WITH SODIUM METAL CATALYST

One hundred parts of beta angelica lactone were stirred for 5 hours at about 80° C. with about 1 per cent of finely divided metallic sodium, and the reaction solution was then worked up for dimeric lactones as described above. There was thus obtained 64 parts of a liquid product boiling at 215 to 225° C. at a receiver pressure of about 3 mm. of mercury. From this, also as described above, there was isolated 41 parts of pure crystalline dimer melting at 87 to 88° C. The solid dimer and the liquid residue had identical saponification equivalents.

Dimerization of alpha angelica lactone with sodium metal under the conditions of this example gave about 40 per cent of mixed dimers.

Other alkali metals, such as potassium and lithium, may be successfully used in place of sodium for dimerizing angelica lactone according to this example.

We have found that the foregoing dimers of angelica lactone may be readily transformed into stable saturated lactone acids by first saponifying the dimers and then acidifying their hot saponification solutions. The lactone acids thus produced are white crystalline compounds differing in melting point and solubility. The lactone acid obtained from the higher melting dimer of angelica lactone is higher melting and less soluble in water than the lactone acid obtained from the lower melting dimer.

Although unlike in melting point and solubility, the lactone acids derived from the angelica lactone dimers possess several properties in common. As pointed out above, they each contain only one lactone ring and only one carboxyl group and have the common molecular formula of $C_{10}H_{14}O_5$. In addition to this they have a common saponification equivalent of about 107 and are further characterized by the fact that they may be converted into dimers of angelica lactone by suitable heating with thionyl chloride. The dimer thus produced from a given lactone acid is the dimer which when saponified and then acidified yields the given lactone acid.

Because of their lactone rings, the lactone acids are potential dicarboxylic acids and possess the general utility of dicarboxylic acids. As monocarboxylic acids they will also provide many useful derivatives, especially their salts, esters, and amides.

The following examples describe in more detail the preparation and properties of the lactone acids and several of their derivatives. Unless otherwise specified, all parts mentioned in the examples are by weight.

EXAMPLE 1

*Lactone acid from the lower melting dimer of angelica lactone*

A mixture of 100 parts of the dimer melting at 83 to 84° C. and 344 parts of 3.1 normal aqueous barium hydroxide solution was refluxed one hour, cooled to room temperature, and then mixed with enough aqueous 6 normal sulfuric acid to yield a solution pH of about 2.4. The precipitated barium sulfate was separated from liquor by centrifuging, and the clear liquor thus obtained was concentrated under reduced pressure until crystals appeared in the concentrate. The concentrate was chilled in an ice bath to promote additional crystallization, and the crystals were then filtered from mother liquor. Further concentration and cooling of the mother liquor yielded an additional crop of crystals. The two crops of crystals were combined and recrystallized from water. The yield of product thus obtained and melting at about 123 to 124° C. was 100 parts, or 92 per cent of theory. The product has a saponification equivalent of about 107, a neutral equivalent of about 214, and its elementary composition and approximate molecular weight indicate that it has the molecular formula of $C_{10}H_{14}O_5$. Its solubility in water at 26° C. is about 21 grams per 100 ml. of saturated solution.

EXAMPLE 2

*Lactone acid from the higher melting dimer of angelica lactone*

Substitution of the higher melting dimer for the lower melting one in the procedure of Example 1 gave 107 parts of a crystalline acidic substance melting at 155 to 156° C. This substance has the same saponification equivalent, neutralization equivalent, elementary composition and approximate molecular weight as the product obtained in Example 1. Its solubility in water at 26° C. is only about 2 grams per 100 ml. of solution.

Both of the lactone acids are saturated, i. e., they do not absorb hydrogen at moderate temperature and pressure in the presence of Raney nickel or Adams platinum oxide catalysts. In addition, both are relatively stable to formation of dilactones by ring closure in aqueous solution.

EXAMPLE 3

*Methyl ester of the lower melting lactone acid*

A solution of 63 parts of the lactone acid in a mixture of 100 parts of methanol, 400 parts of carbon tetrachloride, and 2 parts of concentrated sulfuric acid was distilled slowly at atmospheric pressure until most of the methanol and carbon tetrachloride was removed. The residual crude ester was taken up in benzene. The benzene solution was washed with dilute aqueous sodium bicarbonate solution, dried, and distilled. After removal of benzene, the ester distilled at 153 to 155° C. at a receiver pressure of about 2 mm. of mercury. The yield of distilled ester was 58 parts or 85 per cent of theory. It crystallized on cooling, and after recrystallization from benzene it melted at 73 to 74° C. It was found to have the saponification equivalent of about 114.

EXAMPLE 4

*Ethyl ester of the lower melting lactone acid*

Substitution of ethanol for methanol in the procedure of Example 3 gave an 81 per cent yield of the distilled ethyl ester boiling at 168 to 173° C. at a receiver pressure of about 2 mm. of mercury. It was found to have the saponification equivalent of about 121.

EXAMPLE 5

*Methyl ester of the higher melting lactone acid*

Substitution of the higher melting lactone acid for the lower melting one in the procedure of Example 3 gave an 86 per cent yield of the distilled methyl ester boiling at about 155° C. at a receiver pressure of about 2 mm. of mercury. The ester crystallized on cooling and melted at 64 to 65° C. after recrystallization from benzene. Its saponification equivalent was found to be about 114.

EXAMPLE 6

*Ethyl ester of the higher melting lactone acid*

Substitution of the higher melting lactone acid for the lower melting one in the procedure of Example 4 gave an 83 per cent yield of the distilled ethyl ester boiling at about 170° C. at a receiver pressure of about 2 mm. of mercury. The ester crystallized on standing at room temperature, and melted at 61 to 62° C. after recrystallization from benzene. It was found to have the saponification equivalent of about 121.

EXAMPLE 7

*Salts of the lactone acids*

A slurry of 107 parts of the lactone acid melting at 123 to 124° C. and 200 parts of water was neutralized cold with a solution of 20 parts of sodium hydroxide in 100 parts of water. The base was added slowly with vigorous stirring to the cooled acid slurry so as to prevent any opening of the lactone ring by excessive local overneutralization. The clear solution thus obtained was vacuum evaporated to dryness over a hot water bath. This yielded the sodium salt of the acid as a friable white solid.

Substitution of equivalent quantities potassium and barium hydroxides for sodium hydroxide in the foregoing neutralization and evaporation procedure yielded the corresponding potassium and barium salts. These also were white solids when dry.

The sodium, potassium, and barium salts of the higher melting lactone acid were prepared by the same procedure.

EXAMPLE 8

*Amide of the lower melting lactone acid*

A solution of 100 parts of the angelica lactone dimer melting at 83 to 84° C. in 60 parts of benzene and 500 parts of ethanol was saturated at 0° C. with ammonia. After filtering off 18 parts of precipitated dimer, the clear solution was allowed to stand about three days at room temperature. The reaction solution was then concentrated by evaporation until crystals appeared in the concentrate. The concentrate was cooled to promote additional crystallization and filtered, yielding a first crop of crystals and mother liquor. Additional product was obtained from the mother liquor by evaporating the latter to dryness, taking up the residue in the minimum quantity of hot water, and cooling and seeding this solution with some of the first crop crystals. The second crop of crystals obtained in this way was combined with the first crop and recrystallized from hot water. There was thus obtained 39 parts of white crystalline substance melting at about 193 to 194° C. and found to contain 6.5 per cent nitrogen. The nitrogen content of the amide of molecular formula $C_{10}H_{15}O_4N$ is 6.6 per cent.

EXAMPLE 9

*Conversion of the lactone acids to dimers of angelica lactone*

A mixture of 18 parts of the lower melting acid lactone and 40 parts of freshly distilled thionylchloride was refluxed for two hours. The bulk of the thionylchloride was then distilled from the reaction solution at atmospheric pressure, and the distillation residue was slowly heated to about 240° C. under reduced pressure of about 20 mm. of mercury. Hydrogen chloride was evolved from the residue during this heating. The pressure was then decreased to about 2 mm. of mercury and the bath temperature was slowly raised to about 280° C. There was thus obtained a yellow distillate which on redistillation at about 2 mm. pressure yielded 10 parts of a light yellow oil. This was diluted with about 20 volumes of benzene, allowed to stand two days at room temperature, and filtered to remove separated solids. The benzene was evaporated from the filtrate, and the residue was vacuum distilled. This gave 6 parts of a light yellow oil boiling at about 200° C. at a receiver pressure of about 2 mm. of mercury. The distillate was mixed with 3 volumes of ethanol and allowed to stand at room temperature. Crystals soon appeared in the solution and the mixture was cooled to promote additional crystallization and then filtered. Recrystallization of the crystals thus obtained yielded 4 parts of a white crystalline substance melting at 83 to 84° C. Admixture of this substance with the angelica lactone dimer melting at 83 to 84° C. caused no depression of the melting point of the latter.

Substitution of 18 parts of the higher melting acid lactone for the lower melting one in the foregoing treatment with thionylchloride yielded 11 parts of an oil distilling at about 230° C. at a receiver pressure of about 3 mm. of mercury. On standing at room temperature this oil crystallized to a solid mass. The solidified product was recrystallized once from benzene, yielding 7 parts of white crystals. These were redistilled at about 3 mm. pressure and the fraction boiling at 215 to 225° C. was collected and crystallized once from ethanol. There was thus obtained 3 parts of white crystals melting at 87 to 88° C. and possessing a saponification equivalent of 98. Admixture of this substance with the higher melting dimer of angelica lactone caused no depression in the melting point of the latter.

All temperatures recited herein were measured with an ordinary quality of laboratory mercury thermometer. Distillation pressures were measured with a simple closed end U-tube mercury manometer attached to the vessel receiving the condensed distillate. Owing to the high vapor velocities that occur during low pressure distillation and the consequent pressure drop in the direction of vapor flow, the receiver pressure is always somewhat less than the true distillation pressure, i. e., the vapor pressure over the surface of the boiling liquid.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. Lactone acid of angelica lactone dimer.
2. The lactone acid of angelica lactone dimer having a melting point in the range of 123 to 124° C.
3. The lactone acid of angelica lactone dimer having a melting point in the range of 155 to 156° C.

HANS WOLFF.
WENDELL W. MOYER.

REFERENCES CITED

The following references are of record in the file of this patent:

UNITED STATES PATENTS

| Number | Name | Date |
|---|---|---|
| 2,361,036 | Kung | Oct. 24, 1944 |

OTHER REFERENCES

Marvel et al., J. A. C. S., vol. 61, July 1939, pages 1682–1684.

Bielstein, vol. XVII, pages 252 and 253.